US009388739B2

(12) United States Patent
Marini et al.

(10) Patent No.: US 9,388,739 B2
(45) Date of Patent: Jul. 12, 2016

(54) AIR COOLER SYSTEM FOR GAS TURBINE ENGINES

(75) Inventors: Remo Marini, Montreal (CA); Patrick Germain, Outremont (CA); Ljubisa Vrljes, Etobicoke (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 1107 days.

(21) Appl. No.: 13/462,194

(22) Filed: May 2, 2012

(65) Prior Publication Data

US 2013/0291554 A1 Nov. 7, 2013

(51) Int. Cl.
*F02C 6/08* (2006.01)
*F02C 7/14* (2006.01)

(52) U.S. Cl.
CPC ... *F02C 6/08* (2013.01); *F02C 7/14* (2013.01); *F05D 2250/51* (2013.01); *F05D 2250/62* (2013.01); *F05D 2260/213* (2013.01); *F05D 2260/232* (2013.01); *Y02T 50/676* (2013.01)

(58) Field of Classification Search
CPC ............ F02C 7/14; F02C 7/141; F02C 7/143; F02C 7/16; F02C 7/18; F02C 6/08; F05D 2260/20
See application file for complete search history.

(56) References Cited

U.S. PATENT DOCUMENTS

| | | | |
|---|---|---|---|
| 3,528,250 A | 9/1970 | Johnson | |
| 4,187,675 A * | 2/1980 | Wakeman | 60/806 |
| 4,254,618 A * | 3/1981 | Elovic | 60/226.1 |
| 4,561,257 A | 12/1985 | Kwan et al. | |
| 4,645,415 A | 2/1987 | Hovan et al. | |
| 5,119,624 A | 6/1992 | McKenna | |
| 5,203,163 A | 4/1993 | Parsons | |
| 5,269,135 A | 12/1993 | Vermejan et al. | |
| 5,553,449 A | 9/1996 | Rodgers et al. | |
| 5,729,969 A | 3/1998 | Porte | |
| 6,058,696 A | 5/2000 | Nikkanen et al. | |
| 6,106,229 A | 8/2000 | Nikkanen et al. | |
| 6,182,435 B1 | 2/2001 | Niggemann et al. | |
| 6,269,628 B1 | 8/2001 | Gates | |
| 6,701,715 B2 | 3/2004 | Anderson et al. | |
| 7,377,100 B2 | 5/2008 | Bruno et al. | |
| 7,810,311 B2 | 10/2010 | Schwarz et al. | |
| 7,810,312 B2 | 10/2010 | Stretton et al. | |
| 7,861,512 B2 | 1/2011 | Olver et al. | |
| 7,861,513 B2 | 1/2011 | Stretton | |
| 7,862,293 B2 | 1/2011 | Olver | |
| 7,886,520 B2 | 2/2011 | Stretton et al. | |
| 7,946,806 B2 | 5/2011 | Murphy | |
| 7,966,831 B2 | 6/2011 | Kraft et al. | |
| 8,157,503 B2 | 4/2012 | Junod | |
| 8,181,443 B2 | 5/2012 | Rago | |
| 2008/0271433 A1 | 11/2008 | Olver | |
| 2009/0188232 A1 | 7/2009 | Suciu et al. | |
| 2010/0092116 A1 | 4/2010 | Franconi | |
| 2011/0251743 A1 | 10/2011 | Hu et al. | |

FOREIGN PATENT DOCUMENTS

GB 2098719 A 11/1982
GB 2232720 A 12/1990

* cited by examiner

*Primary Examiner* — Andrew Nguyen
(74) *Attorney, Agent, or Firm* — Norton Rose Fulbright Canada

(57) ABSTRACT

A buffer air cooler system for gas turbine engines disposed in a bypass duct of the engine, includes a housing for containing the buffer air cooler therein and an inlet portion attached to the housing. In one embodiment, the inlet portion has a double-skin configuration in at least one region of a top, bottom and sides of the inlet portion.

12 Claims, 8 Drawing Sheets

AIR COOLER SYSTEM FOR GAS TURBINE ENGINES

TECHNICAL FIELD

The described subject matter relates generally to gas turbine engines, and more particularly to an improved buffer air cooler system for a gas turbine engine.

BACKGROUND OF THE ART

Aircraft gas turbofan engines operate at high temperature levels and therefore, turbine components and bearing cavities require efficient cooling, for example by air bled from the compressor of the engine. However, compressor air which is used to cool the turbine components and bearing cavities, has been heated by the compressor during the compression stage. Conventionally, an air-to-air heat exchanger is located in a bypass air duct of a turbofan gas turbine engine to capture a portion of a relatively cool bypass air flow to cool the relatively warmer compressor bleed air before the compressor bleed air is directed to various locations of the engine for cooling purposes. Such an air-to-air exchanger may be referred to as a buffer air cooler. However, a buffer air cooler disposed in a bypass air duct may cause flow resistance to the bypass air stream flowing through the bypass air duct and other issues affecting engine performance.

Accordingly, there is a need to provide an improved buffer air cooler system for turbofan gas turbine engines.

SUMMARY

In one aspect, the described subject matter provides an air cooler system for a gas turbine engine, comprising: an air cooler receiving a compressor air flow to pass therethrough, the air cooler disposed in an annular bypass air duct of the engine, the air cooler having an inlet opening to direct a flow of bypass air to the air cooler and an exit to direct exhaust air to the bypass air duct, the air cooler radially extending only part way into the bypass air duct to dispose a radial outer side of the cooler spaced apart from an outer wall of the bypass duct, a front wedge circumferentially aligned with the inlet opening and being disposed between the inlet opening and a radial inner edge of the cooler, and the front wedge being shaped to direct airflow between the radial inner edge of the cooler and the inlet opening to increase inlet pressure.

In another aspect, the described subject matter provides a gas turbine engine having an annular bypass air duct around a core engine for directing a bypass air stream, the engine comprising an air cooler receiving a compressor air flow to pass therethrough, the air cooler being disposed in the bypass air duct and radially spaced apart from a radial outer wall of the bypass air duct to allow the bypass air stream to pass between a radial outer side of the air cooler and the radial outer wall of the bypass air duct, the air cooler including an inlet portion at an upstream end of the air cooler, the inlet portion defining an inlet opening for receiving a portion of the bypass air stream to the air cooler to cool the compressor air flow passing through the air cooler, the inlet portion including a front wedge disposed radially between the inlet opening and a radial inner side of the air cooler for directing the bypass air stream passing around the inlet portion to thereby increase pressure of the portion of the bypass air stream into the inlet opening, the air cooler having a downstream end defining an exit to allow the portion of the bypass air stream having entered the inlet opening of the air cooler to re-enter the bypass air stream in the bypass air duct.

In a further aspect, the described subject matter provides an air cooler system for a gas turbine engine, comprising an air cooler receiving a compressor air flow to pass therethrough, the air cooler disposed in an annular bypass duct of the engine, the air cooler radially extending only part way into the bypass air duct to allow a bypass air flow to pass between a radial outer wall of the bypass air duct and a radial outer side of the air cooler, the air cooler including an upstream end defining an inlet opening for directing a portion of the bypass air flow to the air cooler to cool the compressor air flow passing therethrough, the air cooler including a downstream end defining an exit to direct exhaust air into a main stream of the bypass air flow in the bypass air duct, a rear ramp attached to and extending across the downstream end and located at a radial inner side of the air cooler.

Further details of these and other aspects of the described subject matter will be apparent from the detailed description and drawings included below.

BRIEF DESCRIPTION OF THE DRAWINGS

Reference is now made to the accompanying drawings depicting aspects of the described subject matter, in which.

It will be noted that throughout the appended drawings, like features are identified by like reference numerals.

DETAILED DESCRIPTION

Figure 1:
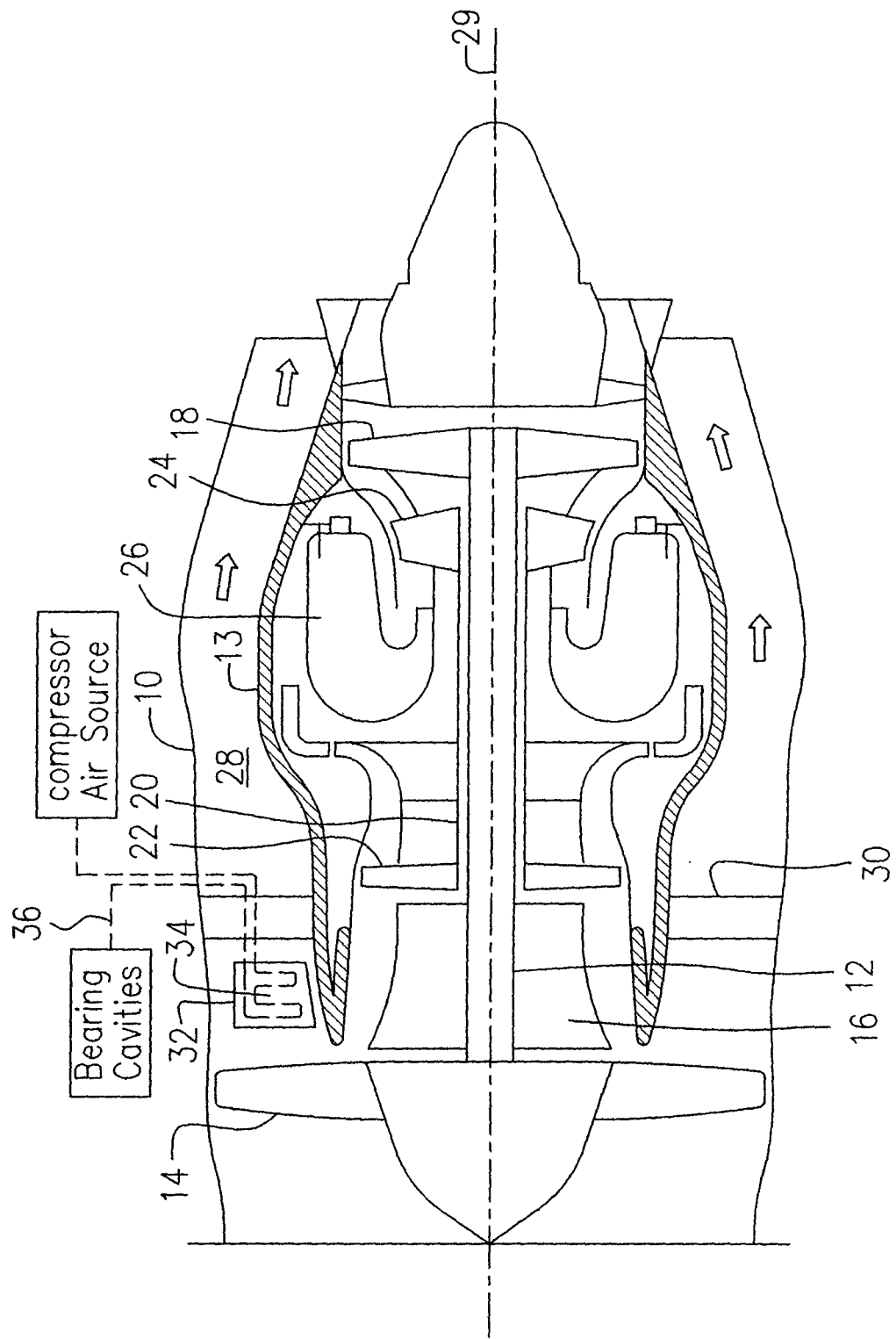
FIG. 1 is a schematic cross-sectional view of a turbofan gas turbine engine, illustrating a buffer air cooler system in the engine, as an exemplary application of the described subject matter.

FIG. 1 illustrates an aircraft turbofan gas turbine engine presented as an example of the application of the described subject matter, including a housing or nacelle annular outer case 10, a annular core casing 13, a low pressure spool assembly seen generally at 12 which includes a fan assembly 14, a low pressure compressor assembly 16 and a low pressure turbine assembly 18, and a high pressure spool assembly seen generally at 20 which includes a high pressure compressor assembly 22 and a high pressure turbine assembly 24. The annular core casing 13 surrounds the low and high pressure spool assemblies 12 and 20 in order to define a main fluid path (not numbered) therethrough. In the main fluid path there is provided a combustor 26. An annular bypass air duct 28 is defined radially between the annular outer case 10 (the annular outer wall of the bypass duct) and the annular core casing 13 (as the annular inner wall of the bypass duct) for directing a main bypass air stream as indicated by hollow arrows (not numbered), driven by the fan assembly 14 to pass therethrough and to be discharged to the atmosphere to create a bypass air thrust to the aircraft engine.

A buffer air cooler system 32 is provided for the turbofan gas turbine engine. The buffer air cooler 32 includes a buffer air cooler 34 which is an air-to-air heat exchanger disposed in the annular bypass air duct 28, for example downstream of the fan assembly and upstream of one of top dead center (TDC) fairings 30. The buffer air cooler 34 is in fluid communication with a compressor air source such as P2.8 or P2.9 in order to direct a compressor air flow 36 to pass through the buffer air cooler 34 in which the compressor air flow 36 is cooled by the relatively cooler bypass air stream passing through the annular bypass air duct 28 and thus washes over a core matrix 35 of the buffer air cooler 34. The cooled compressor air flow 36 may be delivered to various locations (not shown) in the engine such as bearing cavities or other hot turbine components for cooling purposes. Buffer air coolers are known and therefore will not be described in detail herein. A buffer air cooler of a type having a relatively low flow resistance may be selected for reducing the back-pressure footprint caused at upstream fan blade trailing edges of the fan assembly 14 by the buffer air cooler 34 installed in the bypass air duct 28 downstream of the fan assembly 14.

Referring to FIGS. 1-5 and according to one embodiment, the buffer air cooler 34 may be contained within a housing 33 with an inlet portion 38 which provides aerodynamics for the bypass air flows passing through the housing 33 and passing by/over the housing 33. The housing 33 which may be integrated with the buffer air cooler 34 or a separate component, may define an upstream end 48 and a downstream end 49 and between the two ends may include a top 40 a bottom 42 and two side walls 44, 46 (also generally referred to as a radial outer side, a radial inner side and opposed transverse sides when for example, the buffer air cooler 34 of the housing 33 is located in a low position within the annular bypass air duct 28) which are spaced apart from each other and extend between the top 40 and the bottom 42 to define a space (not numbered) for the buffer air cooler 34. The space may be defined in a substantially square or rectangular profile in both transverse and longitudinal dimensions, with respect to a central rotational axis 29 of the engine when the housing 33 is installed within the annular bypass air duct 28, for example downstream of the fan assembly 14 and upstream of one of the TDC fairings 30 which radially extend between the core casing 13 and the outer case 10. The cooler 34 or the housing 33 is disposed in the bypass air duct 28 such as to radially extend only part way into the annular bypass air duct 28 disposing the radial outer side of the cooler 34 or the housing 33 spaced apart from the radial outer wall of the annular bypass air duct 28, in order to allow a bypass air stream (not numbered) to pass through a passageway (not numbered) radially between the radial outer wall of the annular bypass air duct 28 and the radial outer side (top 40) of the cooler 34 or housing 33.

Figure 4:
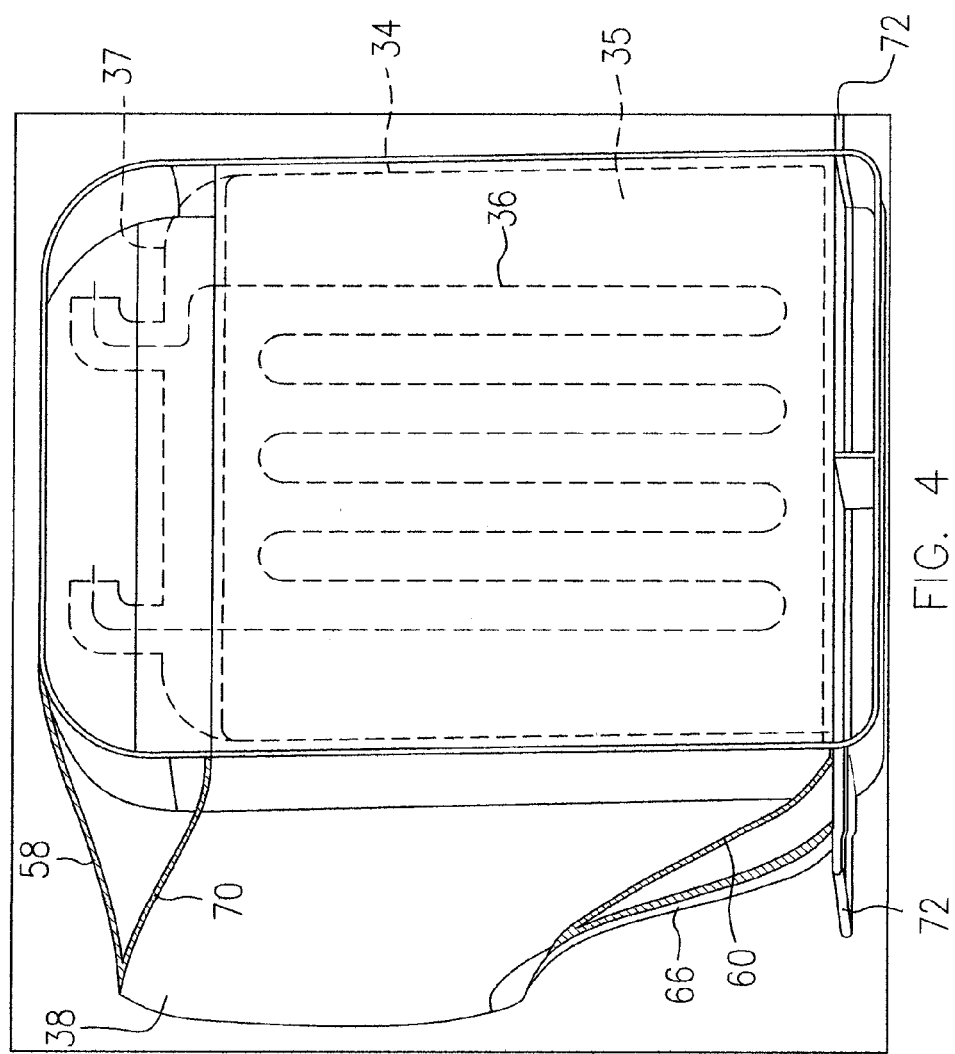
FIG. 4 is rear perspective view of an inlet portion similar to that of FIG. 3, prior to attachment to the housing, having top and bottom portions partially cut away to show a respective double-skin configuration thereof.

According to one embodiment, the buffer air cooler 34, as shown in broken lines in FIG. 4, may have a core matrix 35 of a substantially rectangular profile with a header 37 on the top thereof, which is suitably fitted into the space defined by the housing 33. This will be further described hereinafter.

In one embodiment, the top 40, bottom 42 and side walls 44, 46 of the housing 33 are all in a single-skin configuration. Therefore, the space defined between inner surfaces of the top 40 and bottom 42 and between inner surfaces of the side walls 44, 46, is similar to an outer profile of the housing 33 defined by the outer surfaces of the top 40, the bottom 42 and outer surfaces of the side walls 44, 46.

The inlet portion 38 is attached to the upstream end 48 of the housing 33 to define an inlet opening 50, in order to allow a flow of the bypass air stream driven by the fan assembly 14, to enter and pass through the housing 33. The inlet opening 50 may have an elliptical shape, for example with a short central axis 52 and a long central axis 54 substantially perpendicular to each other. The long central axis 54 may be substantially parallel to the side walls 44, 46 and extends vertically when the housing 33 is installed in a top location within the annular bypass duct 28, as shown in FIG. 1.

The inlet portion 38 in this embodiment may generally include a curved skin (not numbered) extending from an annular edge 56 of the elliptical inlet opening 50 toward and attached to the upstream end 48 of the housing 33. The upstream end 48 may be substantially rectangular, being defined by the top 40, bottom 42 and side walls 44, 46 of the housing 33. The curved inlet skin may define a curved inlet top 58, inlet bottom 60 and inlet sides 62, 64 to provide a curved outer surface extending from the annular edge 56 of the inlet opening 50 to the upstream end 48 of the housing 33, thereby creating an aerodynamic profile of a front of the housing 33, in order to reduce flow distortion at the inlet portion 38 of the housing 33 due to bypass upstream total pressure and total temperature boundary conditions. The curved outer surface of the inlet portion 38 is designed to minimize or prevent flow separation due to flow spillage which is a contributor to bypass air loss and noise.

In one embodiment, a front wedge 66 may be disposed immediately below the inlet opening 50 and attached to the inlet skin at the inlet bottom 60 in order to further deviate and guide the low-momentum bypass air stream around the relatively high flow resistance of the housing 33, thereby minimizing regions of flow separation occurring upstream of the housing 33 and also on the side walls 44 and 46 of the housing 33. The front wedge 66 may be provided in a hollow configuration defined by two wedge side walls (not numbered) joined at a central front edge 68 (see FIG. 2) and forming wedge surfaces extending divergently from the central front edge 68 toward and to be attached to the curved outer inlet surface at the inlet bottom 60 of the inlet portion 38. A bottom wall (not shown) of the front wedge 66 may be provided to close a bottom opening of the hollow configuration of the front wedge 66. The hollow front wedge 66 in combination with the skin of the inlet bottom 60 to which the front wedge 66 is attached, forms a double-skin configuration of the inlet bottom 60. Therefore, the surfaces of the front wedge 66 provide an aerodynamic profile to deviate and guide the bypass air stream to flow around the bottom and sides of the housing 33 while an inner surface of the inlet skin at the inlet bottom 60, defines an inner boundary of the inlet portion 38 for guiding the flow of the bypass air stream entering the inlet opening 50 to spread over the transverse cross-section of the housing 33 before passing through and washing over the core matrix 35 of the buffer air cooler 34 contained within the housing 33.

In one embodiment, the central front edge 68 of the front wedge 66 may extend downwardly from the annular edge 56 of the inlet opening 50 in a substantially radial direction with respect to the rotational axis 29 (shown in FIG. 1) of the engine, or may substantially superpose an extension of the long central axis 54 of the inlet opening 50 when the housing 33 is disposed in a top location within the annular bypass air duct 28 as shown in FIG. 1.

An exit opening 51 is defined at the downstream end 49 of the housing 33 (see FIG. 7) between the top 40 and bottom 42, and between the side walls 44 and 46 to allow the flow of the bypass air streams entering the inlet opening 50 and passing through the housing 33 (also passing by/through the buffer air cooler 34) to re-enter the bypass duct 28 (shown in FIG. 1).

In one embodiment, the inlet portion 38 may include an inner top skin 70 (more clearly shown in FIG. 4) extending from a top portion of the annular edge 56 of the inlet opening 50 rearwardly toward the upstream end 48 of the housing 33. The inner top skin 70 and the top portion 58 of the inlet skin in combination, form a double-skin configuration in the top of the inlet portion 38. As above described, the outer surface of the inlet portion 38 at the inlet top 58 is curved to provide an aerodynamic profile to guide the bypass air stream around the top 40 of the housing 33 to reduce the area in which flow separation occurs. Meanwhile, the inner top skin 70 can provide a desirable curved profile, independent from the curved profile of the outer skin of the inlet top 58, to direct the flow of the bypass air stream entering the inlet opening 50 for a better distribution over the traverse cross-section of the housing 33 prior to passing through the core matrix 35 of the buffer air cooler 34. The buffer air cooler 34 is schematically illustrated in broken lines in FIG. 4 in which, the rectangular portion is the core matrix 35 of the buffer air cooler including air passages for the compressor air flow 36 to pass therethrough and also including passages or clearances (not shown) to allow the flow of the bypass air stream entering the inlet opening 50 to pass by and/or through the core matrix 35, thereby washing the core matrix 35 to absorb heat energy transferred from the compressor air flow 36 to the core matrix 35 of the buffer air cooler 34. The buffer air cooler 34 may include a header 37 attached to the top of the core matrix 35. The header 37 may include fittings to be connected to external pipelines (not shown) for circulation of the compressor air flow 36 passing through the core matrix 35 of the buffer air cooler 34.

In one embodiment, the header 37 is disposed downstream of and substantially aligned with the double-skin configuration of the inlet top 58 such that the header 37 is substantially blocked by the double-skin configuration of the inlet top 58 from exposure to both the bypass air streams flowing around the inlet portion 38 and the housing 33 and to the flow of bypass air streams entering the inlet opening 50 to pass through the inlet portion 38 and the housing 33. Such an arrangement advantageously prevents flow resistance and resulting pressure loss of the bypass air stream which might be created if the header 37 of the buffer air cooler 34 was exposed to the bypass air stream outside of the housing 33 or was exposed to the flow of bypass air stream passing through the housing 33.

It should be noted that the broken lines in FIG. 4 indicate a position of the buffer air cooler 34 in the cross-section of a downstream end of the inlet portion 38 which is also the upstream end 48 of the housing 33. The buffer air cooler 34 is substantially contained in the space defined by the top 40, bottom 42 and side walls 44, 46 of the housing 33. The buffer air cooler 34 may be removably contained within the housing 33 or may be incorporated with the housing 33. For example, the bottom 42 and side walls 44, 46 of the housing 33 may be part of the core matrix 35 of the buffer air cooler 34.

Figure 6:
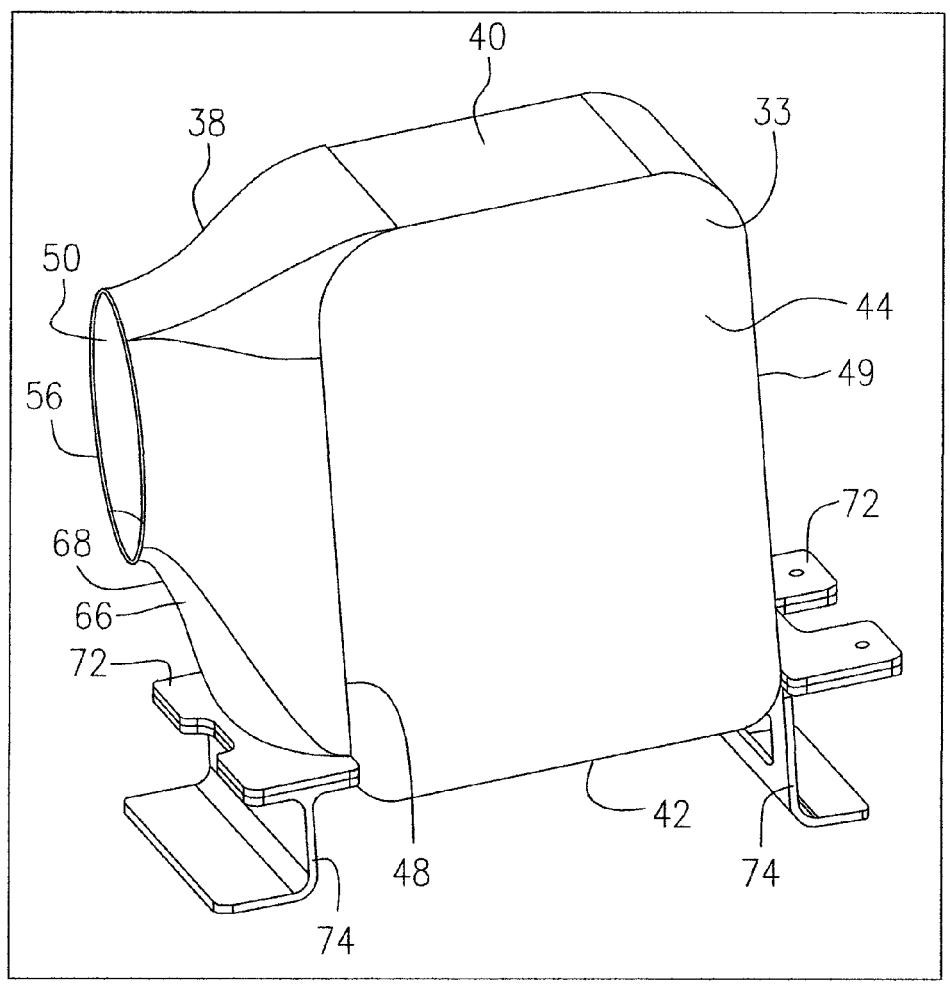
FIG. 6 is a side perspective view of a housing with an inlet portion similar to that shown in FIG. 3, having support brackets for installation within the bypass duct of the engine.

Referring to FIGS. 1, 4 and 6 and according to one embodiment, the housing 33 with the inlet portion 38 may be provided with a support plate 72, attached for example to the inlet portion immediately below the front wedge 66 and to the downstream end 49 of the housing 33 near the bottom 42. The support plate 72 may be mounted on a pair of brackets 74 which for example may be affixed to an inner duct wall of the annular bypass duct 28 defined by the core casing 13.

Figure 3:
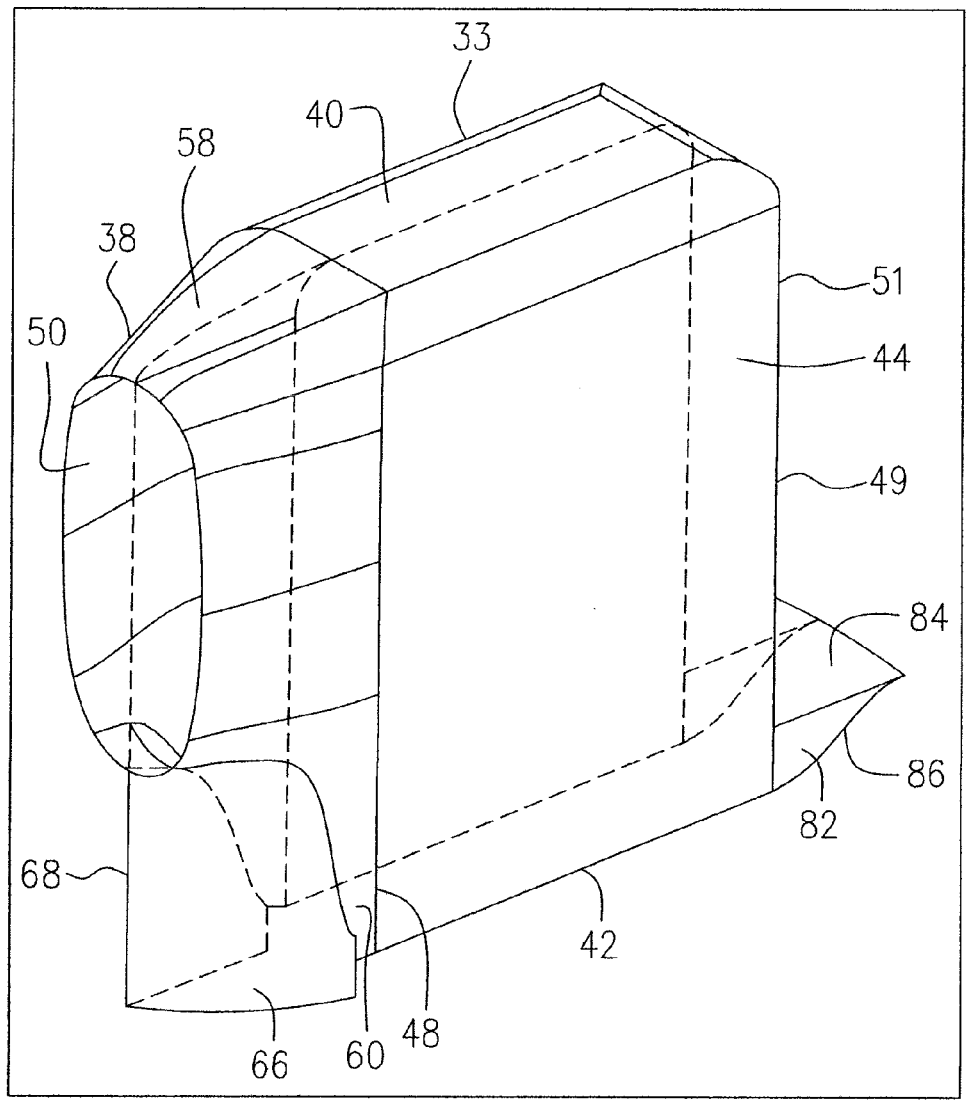
FIG. 3 is a schematic perspective view of the housing with the inlet portion of FIG. 2, with broken lines showing an imaginary central cross-section of the housing with the inlet portion.
Figure 5:
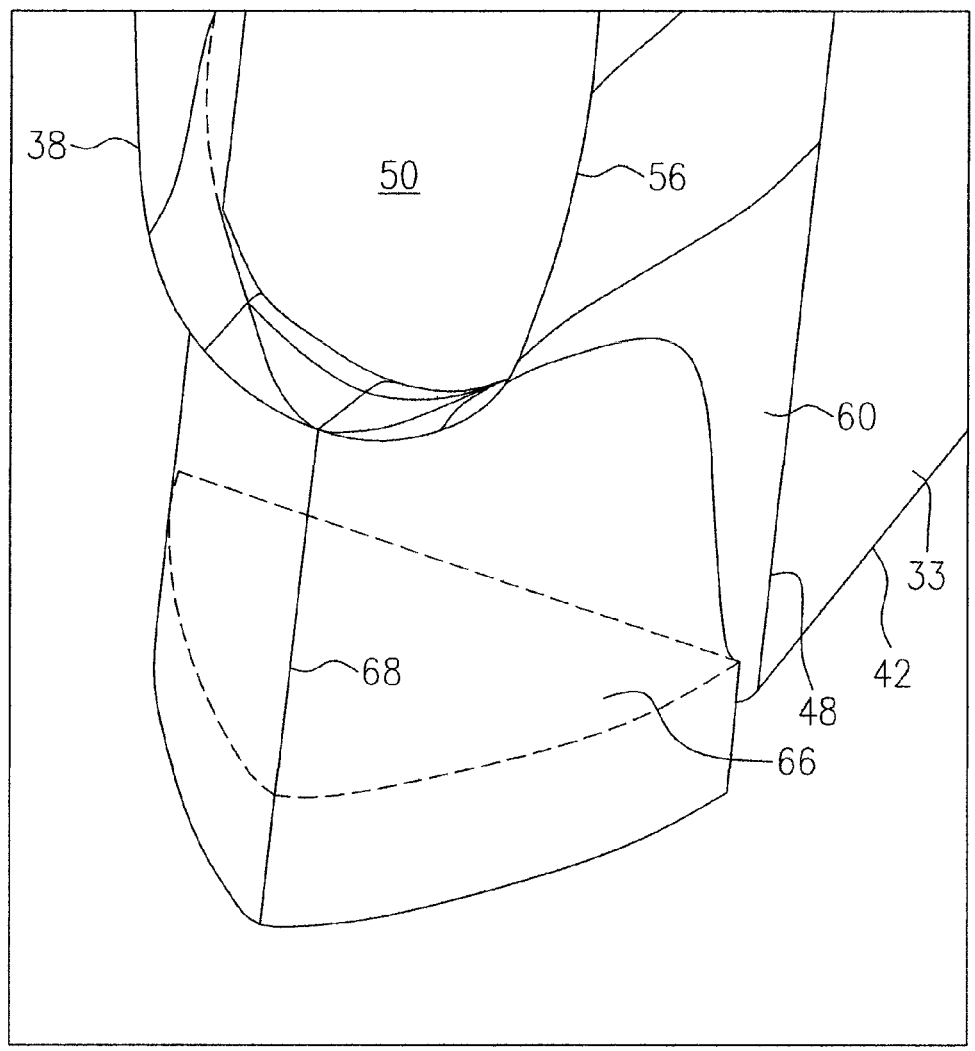
FIG. 5 is a partial front perspective view of the housing with the inlet portion of FIG. 3, showing a front wedge positioned immediately below an inlet opening of the inlet portion of the housing, having broken lines showing the wedge-shaped hollow configuration within the front wedge.

It should be noted that the front wedge 66 of the inlet portion 38 in FIGS. 4 and 6 may be configured with the central front edge 68 extending in a curve from the annular edge 56 of the inlet opening 50, downwardly and rearwardly towards the outer skin of the inlet portion 38, rather than the straight line of the central front edge 68 of the front wedge 66, as shown in FIGS. 3 and 5.

The housing 33 may or may not include a rear ramp. In one embodiment shown in FIG. 3, the housing 33 is provided with a rear ramp 82 attached to the housing and extending across the downstream end of the housing 33, located at the bottom 48 of the housing 33. The rear ramp 82 may also have a double-skin configuration having an upper surface 84 for guiding the flow of bypass air stream discharged from the exit opening 51 to re-enter the bypass air duct 28, and a lower surface 86 for guiding the bypass air stream passing over the bottom 42 of the housing 33 to join the flow of the bypass air stream discharged from the exit opening 51 of the housing 33. The upper surface 84 and lower surface 86 of the rear ramp 82 may be provided with different aerodynamic profiles in order to meet different aerodynamic requirements of the respective air flows passing through the housing 33 and passing over the bottom 42 of the housing 33.

Figure 2:
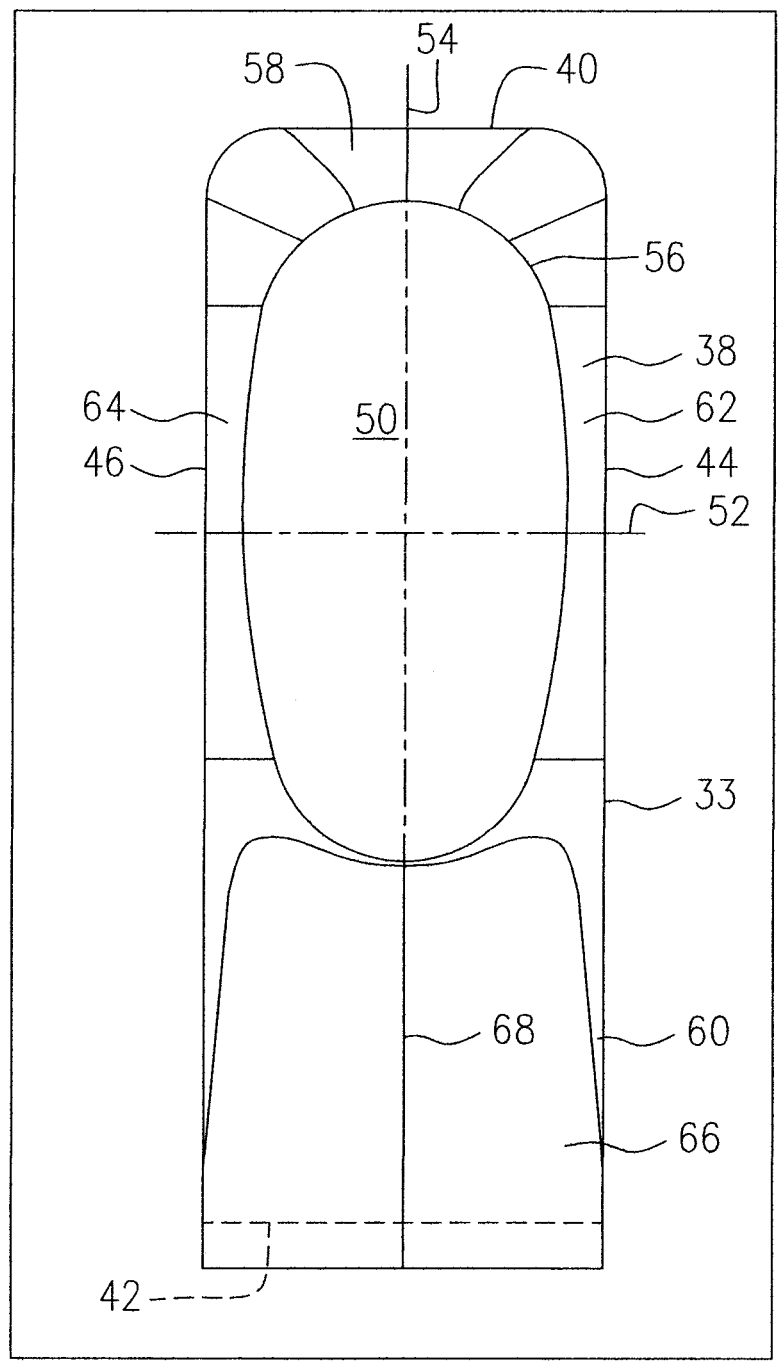
FIG. 2 is a front elevational view of a housing with an inlet portion for a buffer air cooler according to one embodiment used in the system shown in FIG. 1.
Figure 7:
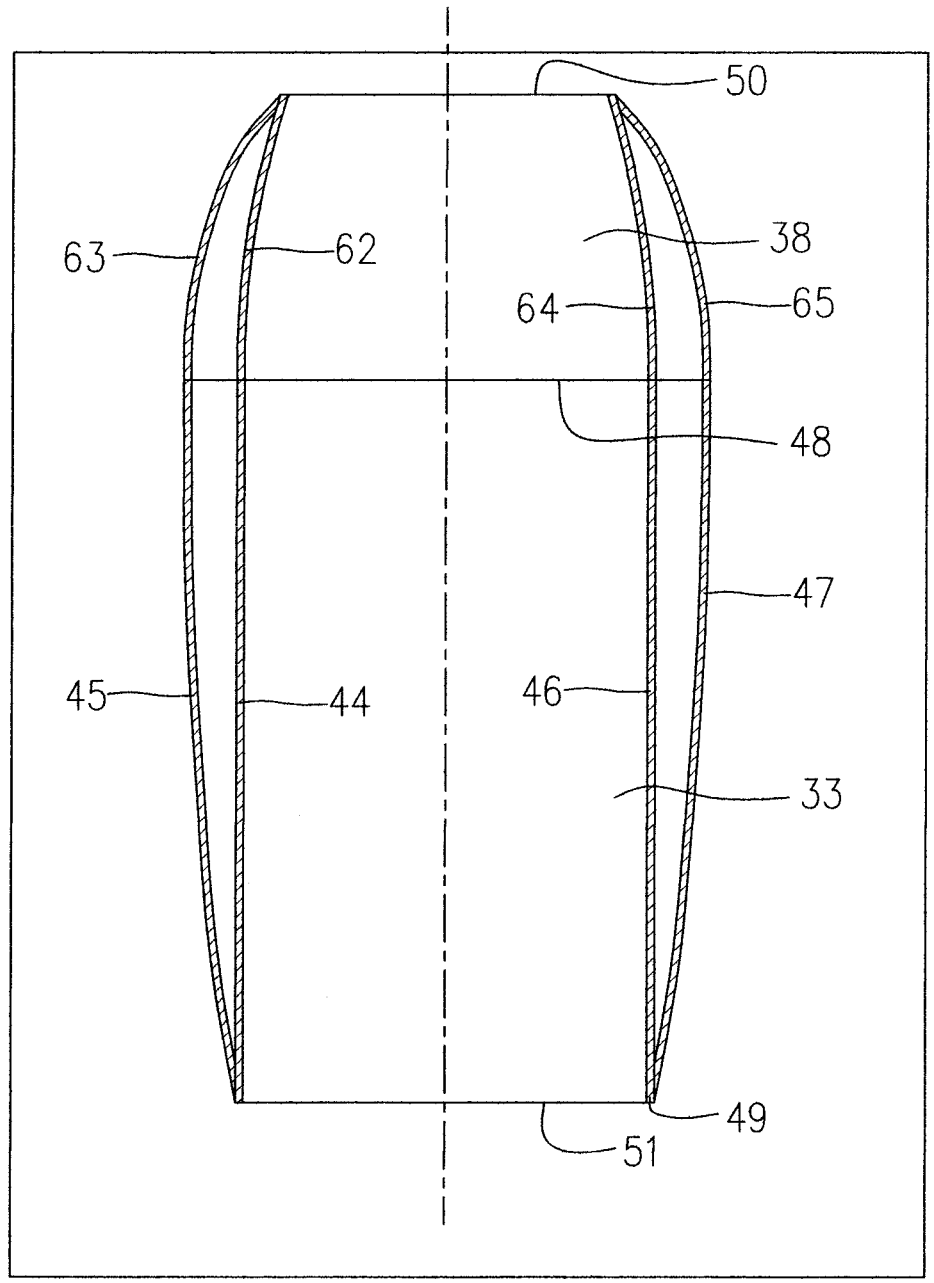
FIG. 7 is a schematic top plane view of a housing with an inlet portion similar to that shown in FIG. 3, having a double-skin configuration in each side according to another embodiment.

Referring to FIG. 7 and according to one embodiment, the housing 33 may have a similar configuration to that of the housing shown in FIG. 2, except for the side wall configuration. In contrast to the single-skinned inlet sides 62, 64 of the inlet portion 38 of FIG. 2, inlet sides 62, 64 of the inlet 38 of FIG. 7 are provided with external side skins 63 and 65 respectively, to form a double-skin configuration at each inlet side. In contrast to the single skinned side walls 44, 46 of the housing 33 of FIG. 2, the side walls 44, 46 of the housing 33 of FIG. 7 are provided with external side skins 45 and 47 respectively which form a double-skin configuration at each side of the housing 33. The external inlet side skins 63, 65 are curved and extend smoothly rearwardly to join the curved side skins 45, 47 of the housing 33, thereby providing a required aerodynamic profile of the inlet portion 38 and the housing 33 to guide the bypass air stream flowing by the sides of the inlet portion 38 and the housing 33. Meanwhile, the inlet sides 62, 64 and the side walls 44, 46 of the housing 33 provide an inner flow boundary of the inlet portion 38 and the housing 33, with an aerodynamic profile independent from the aerodynamic profile of the housing provided by the external skins 63, 65, 45 and 47, to meet the flow dynamic requirements for air flow passing through the inlet portion 38 and housing 33 and the flow dynamic requirements for air passing through the buffer air cooler 34 contained within the housing 33.

Figure 8:
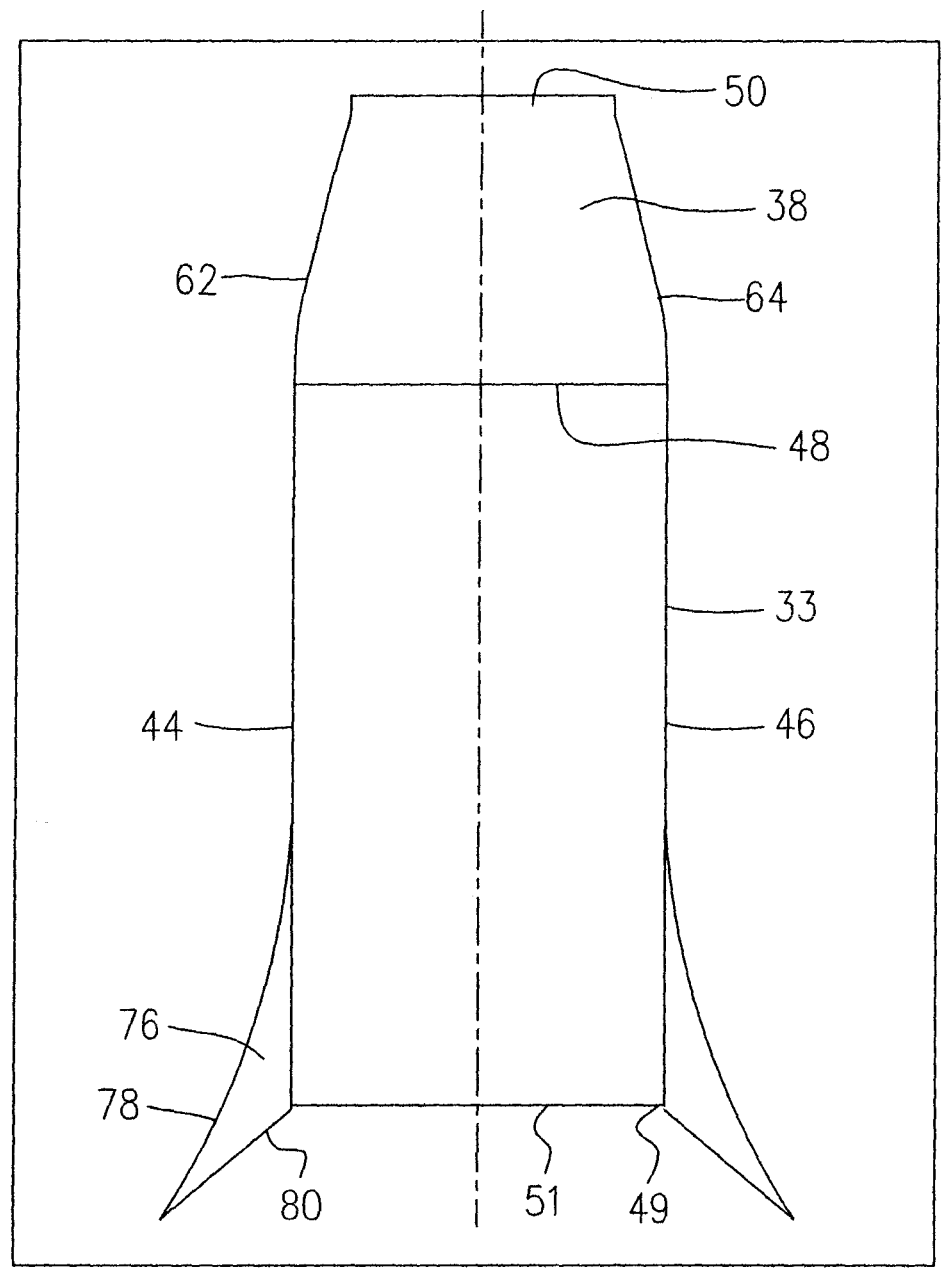
FIG. 8 is a schematic top plane view of a housing with an inlet portion similar to that shown in FIG. 3, having rear deflectors at each side of the housing according to a further embodiment.

Referring to FIG. 8 and according to one embodiment, the inlet portion 38 and the housing 33 may be similar to the inlet 38 and the housing 33 of FIG. 2, except for the addition of deflectors 76 attached to each of the side walls 44, 46 adjacent the downstream end 49 of the housing 33. Each of the deflectors 76 may have an outer surface 78 for guiding the bypass air stream flowing over the sides of the housing 33 and an inner surface 80 for guiding the flow of the bypass air stream discharged from the exit opening 51 of the housing 33, thereby boosting the pressure differential over the housing 33 and thus over the buffer air cooler 34 contained therein, in order to achieve the required mass flow to pass through the housing 33.

The double-skin configuration according to one embodiment such as in the inlet portion 38, can advantageously have different curvature distributions and extensions of the respective inner and outer surfaces in order to provide different aerodynamic profiles for the bypass air streams flowing around the housing 33 and for the flow of the bypass air stream flowing through the housing 33 and through the buffer air cooler 34 contained in the housing 33. Therefore, it is possible to fine-tune the overall housing inlet configuration to bypass duct upstream flow field conditions and to the buffer air cooler resistance, i.e. inlet opening area, curvature, tangency, angle of attack, length, etc. Therefore, the back-pressure footprint of the installed buffer air cooler 34 which may occur at the upstream fan blade trailing edges, can be reduced.

The above description is meant to be exemplary only, and one skilled in the art will recognize that changes may be made to the embodiments described without departure from the scope of the described subject matter. For example, the curved profiles of the inlet portion and the housing illustrated in the drawings are examples to illustrate the described embodiments. Various geometrical profiles other than those illustrated may be defined with the inlet portion and the housing to meet different aerodynamic requirements of various engines. The described embodiments and the illustrations of the drawings are substantially focused on the general concept of the described subject matter rather than structural features, which may vary from those illustrated. Still other modifications which fall within the scope of the described subject matter will be apparent to those skilled in the art, in light of a review of this disclosure, and such modifications are intended to fall within the appended claims.

The invention claimed is:

1. An air cooler system for a gas turbine engine, comprising:
    an air cooler receiving a compressor air flow to pass therethrough, the air cooler disposed in an annular bypass air duct of the engine, the air cooler having an inlet opening to direct a flow of bypass air to the air cooler and an exit to direct exhaust air to the bypass air duct, the air cooler radially extending only part way into the bypass air duct to dispose a radial outer, side of the cooler spaced apart from a outer wall of the bypass duct, a front wedge having a radial central front edge circumferentially aligned with the inlet opening, the front wedge being disposed between the inlet opening and a radial inner edge of the cooler, and the front wedge being shaped to split air flow passing by the radial central front edge and to direct the split airflow around the air cooler to increase inlet pressure;
    wherein the radial central front edge extends radially inwardly from an annular edge of the inlet opening and wedge surfaces extend divergently from the radial central front edge of the wedge; and
    wherein the inlet opening is elliptical, defining a short central axis and a long central axis perpendicular to each other, an extension of the long central axis substantially superposing the radial central front edge of the front wedge.

2. The air cooler system as defined in claim 1 wherein the air cooler comprises a housing having radial outer and inner sides and opposed transverse sides, an inlet portion attached to an upstream end of the housing, the inlet portion defining the inlet opening and having the front wedge, the inlet portion having a double-skin configuration to provide an inner cross-section of an inlet passageway different from an outer cross-sectional profile of the inlet portion.

3. The air cooler system as defined in claim 2 wherein the radial outer and inner sides and the transverse sides of the housing define a single-skin housing configuration between the upstream end and a downstream end of the housing.

4. The air cooler system as defined in claim 2 wherein the inlet portion comprises opposed inlet sides each in a double-skin configuration, wherein each of the transverse sides of the housing comprises a double-skin configuration as a smooth extension of the double-skin configuration of the respective opposed inlet sides of the inlet portion, and wherein outer skins of the inlet portion and the housing define an outer aerodynamic side profile with respect to a bypass air stream flowing around the inlet sides of the inlet portion and the transverse sides of the housing, the outer aerodynamic side profile being different from an inner aerodynamic side profile defined by inner skins of the inlet portion and housing with respect to the flow passing through the inlet portion and housing.

5. The air cooler system as defined in claim 2 wherein the housing comprises a rear ramp attached to and extending across a downstream end and located at the bottom of the housing.

6. The air cooler system as defined in claim 2 wherein the housing comprises a pair of deflectors attached to a downstream end of the housing and forming a rear extension of the respective transverse sides of the housing, the deflectors having an outer surface and an inner surface for guiding the respective bypass air stream flowing around the transverse sides of the housing and flow being discharged from the exit opening of the housing to re-enter the bypass air stream.

7. The air cooler system as defined in claim 2 wherein the housing is located upstream of a top dead centre fairing which extends radially between outer and inner walls of the annular bypass duct.

8. The air cooler system as defined in claim 2 wherein the housing is supported on an inner wall of the annular bypass air duct.

9. A gas turbine engine having an annular bypass air duct around a core engine for directing a bypass air stream, the engine comprising an air cooler receiving a compressor air flow to pass therethrough, the air cooler being disposed in the bypass air duct and radially spaced apart from a radial outer wall of the bypass air duct to allow the bypass air stream to pass between a radial outer side of the air cooler and the radial outer wall of the bypass air duct, the air cooler including an inlet portion at an upstream end of the air cooler, the inlet portion defining an inlet opening for receiving a portion of the bypass air stream to the air cooler to cool the compressor air flow passing through the air cooler, the inlet portion including a front wedge having a radial front edge, the front wedge being disposed radially between the inlet opening and a radial inner side of the air cooler and being shaped to split the bypass air stream passing by the radial central front edge and to direct the split bypass air stream passing around the inlet portion to thereby increase pressure of the portion of the bypass air stream into the inlet opening, the air cooler having a downstream end defining an exit to allow the portion of the bypass air stream having entered the inlet opening of the air cooler to re-enter the bypass air stream in the bypass air duct;
    wherein the radial central front edge extends radially inwardly from an annular edge of the inlet opening and wedge surfaces extend divergently from the radial central front edge of the wedge; and
    wherein the inlet opening is elliptical, defining a short central axis and a long central axis perpendicular to each other, an extension of the long central axis substantially superposing the radial central front edge of the front wedge.

10. The engine as defined in claim 9 wherein the inlet portion comprises a double-skin configuration to provide different aerodynamic profiles with respect to the respective bypass air stream flowing over the inlet portion and the portion of the bypass air stream entering the inlet opening.

11. The engine as defined in claim 9 comprising a rear ramp extending across the downstream end and being located at a radial inner side of the air cooler.

12. The engine as defined in claim 9 comprising a pair of deflectors attached to respective opposed transverse sides at the downstream end of the air cooler and forming a rear extension of the respective transverse sides of the air cooler, the deflectors having an outer surface and an inner surface for guiding respective bypass air stream flowing around the transverse sides of the air cooler and flow being discharged from the exit of the cooler to re-enter the bypass air stream.

* * * * *